(12) United States Patent
Nagpal et al.

(10) Patent No.: US 6,423,803 B1
(45) Date of Patent: Jul. 23, 2002

(54) POLYMERIZABLE POLYOL (ALLYL CARBONATE) COMPOSITIONS

(75) Inventors: Vidhu J. Nagpal, Murrysville; Charles R. Wiedrich, Export, both of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/461,847

(22) Filed: Dec. 15, 1999

(51) Int. Cl.$^7$ ................................................. C08F 18/24
(52) U.S. Cl. ........................ 526/314; 526/332; 526/333
(58) Field of Search .................. 526/314, 332, 526/333

(56) References Cited

U.S. PATENT DOCUMENTS

| | | | |
|---|---|---|---|
| 4,419,467 A | 12/1983 | Wismer et al. | 523/414 |
| 5,162,475 A | 11/1992 | Tang et al. | 526/333 |
| 5,296,627 A | 3/1994 | Tang et al. | 558/34 |
| 6,077,921 A | 6/2000 | Nagpal et al. | 526/314 |

FOREIGN PATENT DOCUMENTS

EP  0 284 139 A2  9/1988

Primary Examiner—Helen L. Pezzuto
(74) Attorney, Agent, or Firm—Carol A. Marmo; James R. Franks

(57) ABSTRACT

A polymerizable composition is described, which composition comprises a polyol(allyl carbonate) monomer, e.g., diethylene glycol bis(allyl carbonate) monomer, and an additive represented by the general formula, $$R_2-O-(R_3O)_x-(R_4O)_y-(R_5O)_z-R_6$$

wherein $R_2$ and $R_6$ are each selected independently from hydrogen, $C_1-C_{20}$ linear or branched alkyl, cycloalkyl having from 5 to 7 carbon atoms in the cyclic ring, aryl, $C_2-C_{20}$ linear or branched alkanoyl, cycloalkanoyl having from 5 to 7 carbon atoms in the cyclic ring and aroyl, $R_2$ and $R_6$ each being free of radically polymerizable ethylenically unsaturated groups; $R_3O$ and $R_5O$ are the same or different; $R_4O$ is different than each of $R_3O$ and $R_5O$; $R_3O$, $R_4O$ and $R_5O$ are each independently a divalent residue of an epoxide; x and z are each independently a number from 0 to 200, provided that the sum of x and z is greater than zero; and y is a number from 3 to 200. The additive is present in the composition of the present invention in an amount at least sufficient such that a polymerizate of the composition is substantially free of tinting defects, such as ferns and moons.

17 Claims, 1 Drawing Sheet

POLYMERIZABLE POLYOL (ALLYL CARBONATE) COMPOSITIONS

DESCRIPTION OF THE INVENTION

The present invention relates to a polymerizable organic composition. More particularly, the present invention relates to a polymerizable composition comprising a polyol(allyl carbonate) monomer and a block copolymeric polyether additive that is free of radically polymerizable ethylenically unsaturated groups. The present invention relates also to polymerizates, e.g., lenses, obtained from said compositions.

Polymerizable organic compositions based on polyol (allyl carbonate), particularly diethylene glycol bis(allyl carbonate), and polymerizates obtained therefrom are well known in the art. Polymerizates of polymerizable organic compositions based on homopolymers of diethylene glycol bis(allyl carbonate) possess excellent clarity, good flexibility and abrasion resistance. Examples of applications for which such polymerizates may be used include, ophthalmic lenses, sunglasses, and automotive and aircraft transparencies. It has been observed that tinting of polymerizates prepared from such compositions by surface impregnation of dyes can, in certain instances, result in an uneven tinting of the surface. Such uneven tinting is referred to as tinting failure.

When tinting failure occurs, it is often manifested as visually observable defects on the tinted surface(s) of the polymerizate, which are commonly referred to as "ferns" or "moons." In the case of tinted ophthalmic lenses, such as tinted ophthalmic lenses having a positive diopter, i.e., plus lenses, and non-corrective lenses, e.g., sunglasses, such tinting failure often results in rejection and scrapping of the tinted lens. A solution to tinting failure is desirable in order to avoid the economic loss that results from the scrapping of lenses having tinting defects.

U.S. Pat. No. 5,973,093 describes polymerizable organic compositions of a major amount of polyol(allyl carbonate) and from about 2 to 35 weight percent of an alkoxylated bisphenol having acrylate or methacrylate groups. The polymerizable compositions of the '093 patent are also described as optionally comprising from 0.05 to 15 weight percent of a flexibilizing additive having no radically polymerizable groups, such as allyl or methacryloyl groups.

European Patent Application No. EP 903,217 A2 describes a cast-molding material for a plastic lens which is almost free from causing defective dyeing when dyed. The cast-molding material of the EP 903,217 application is described as containing a combination of diethylene glycol bis(allyl carbonate) and a polyether-modified silicone compound.

U.S. Pat. No. 4,374,745 describes an aqueous or gel cleaning composition which comprises from 0.02 to 25 percent by weight of at least one nonionic cleaner, e.g., oxyethylene oxypropylene polymers, from 0.01 to 10 percent by weight of a diglycol carbonate monomer, e.g., diethylene glycol bis(allyl carbonate), and the balance being water. The cleaning compositions of the '745 patent are described as being especially suitable for cleaning glass and plastic lenses and eyeglass frames.

U.S. Pat. No. 4,310,330 describes a method for the manufacture of a colored nonfogging article, which comprises bringing a nonfogging substrate containing surfactant into contact with a dyeing solution containing a surfactant, a solvent and a coloring material. The nonfogging substrate of the '330 patent is described as an article of plastic material or glass which has its surface coated with a film made of a nonfogging resin containing a surfactant.

It has now been discovered that cured polymerizates prepared from the polymerizable compositions of the present invention are substantially free of tinting defects, for example, tinting defects referred to in the art as ferns or moons. In accordance with the present invention there is provided a polymerizable composition comprising:

(a) a radically polymerizable monomer represented by the following general formula I,

$$R\text{---}[\text{---}O\text{---}C(O)\text{---}O\text{---}R_1]_i \qquad I$$

wherein R is a polyvalent residue of a polyol having at least two hydroxy groups, $R_1$ is an allyl group, and i is a whole number from 2 to 4; and (b) an additive represented by the following general formula II,

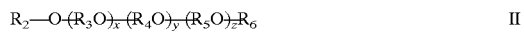

$$R_2\text{---}O\text{-}(R_3O)_x\text{-}(R_4O)_y\text{-}(R_5O)_z\text{-}R_6 \qquad II$$

wherein $R_2$ and $R_6$ are each selected independently from hydrogen, $C_1$–$C_{20}$ (e.g., $C_1$–$C_6$ or $C_1$–$C_4$) linear or branched alkyl, cycloalkyl having from 5 to 7 carbon atoms in the cyclic ring, aryl (e.g., phenyl or benzyl), $C_2$–$C_{20}$ (e.g., $C_2$–$C_4$) linear or branched saturated or unsaturated alkanoyl, saturated or unsaturated cycloalkanoyl having from 5 to 7 carbon atoms in the cyclic ring and aroyl (e.g., benzoyl), $R_2$ and $R_6$ each being free of radically polymerizable ethylenically unsaturated groups; $R_3O$ and $R_5O$ are the same or different; $R_4O$ is different than each of $R_3O$ and $R_5O$; $R_3O$, $R_4O$ and $R_5O$ are each independently a divalent residue of an epoxide; x and z are each independently a number from 0 to 200, provided that the sum of x and z is greater than zero; and y is a number from 3 to 200. Additive (b) is present in the composition of the present invention in an amount at least sufficient such that a polymerizate of the composition is substantially free of tinting defects, such as ferns and moons.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying illustrative drawing.

Other than in the operating examples, or where otherwise indicated, all numbers expressing quantities of ingredients, reaction conditions, etc. used in the specification and claims are to be understood as modified in all instances by the term "about."

DETAILED DESCRIPTION OF THE INVENTION

Figure 1:
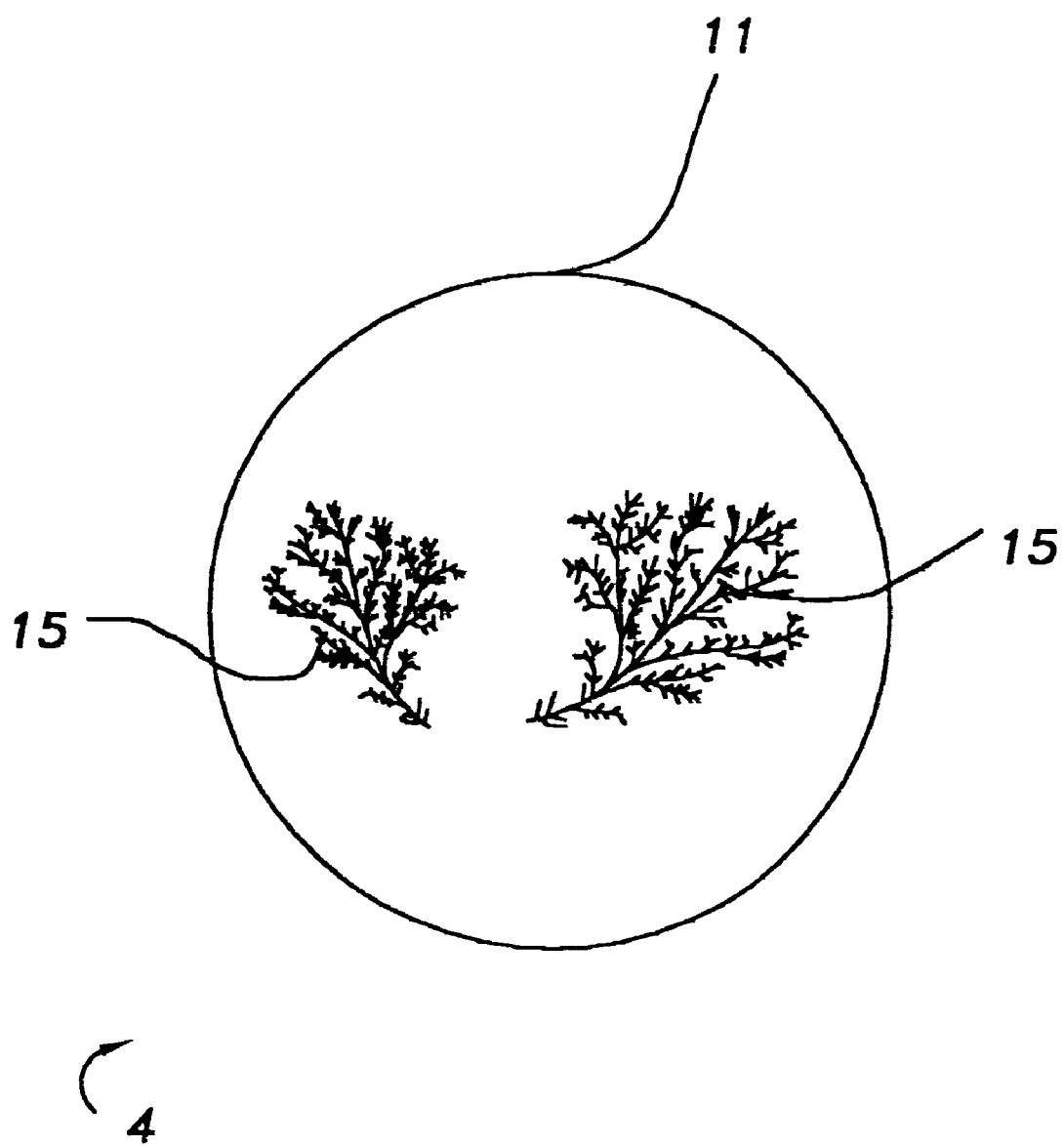
FIG. 1 is a representation of a negative image of a tinted lens having tinting defects.

The additive material described with reference to general formula II is present in the polymerizable compositions of the present invention in an amount at least sufficient such that polymerizates prepared from such compositions are substantially free of tinting defects. As used herein and in the claims, the term "tinting defects" and similar terms refer generally to a visually observable uneven distribution of dye over the surface of a tinted polymerizate, such as a tinted lens. More particularly, tinting defects are often visually observable as lighter colored or untinted surface patterns, sometimes in the form of ferns or moons.

Tinting defects in the form of ferns can be further described with reference to FIG. 1. The tinted polymerizate 4 of FIG. 1 is a tinted plus lens 11, prepared from diethylene glycol bis(allyl carbonate) monomer, and having tinting defects 15 thereon. For purposes of illustration, the tinting defects 15 of FIG. 1 are shown as a negative image. As used herein, by "plus lens" is meant a lens having a positive (+) diopter, i.e., a lens having a positive focal length or real focal point. The tinting defects shown in the lens depicted in FIG. 1 were observed in a lens having a plus five (+5) diopter.

Tinting defects in the form of moons (not shown in FIG. 1) are typically observed as a series of concentric circles of varying tint strength on the surface of the tinted lens. In some instances a tinted lens will exhibit a combination of both moon and fern type tinting defects.

The occurrence of tinting defects with polymerizates prepared from polyol(allyl carbonate) monomers is a largely statistical phenomenon. Accordingly, in order to determine if a polymerizable composition can be used to prepare polymerizates that are "substantially free of tinting defects," more than one polymerizate, e.g., several lenses, should be prepared. optionally, a set of comparative polymerizates may also be prepared under similar conditions, e.g., using the same cure cycle, from a composition that is known to result in tinting defects. The specific number of polymerizates that must be prepared is often determined by trial and error. In the case of ophthalmic lenses, typically between 10 and 100 lenses are prepared to determine if they are substantially free of tinting defects. Such a determination is described in further detail in the Examples herein. Typically, a set of polymerizates, e.g., 100 ophthalmic plus lenses, prepared from a polymerizable composition according to the present invention, is considered to be substantially free of tinting defects if 10 percent or less, preferably 5 percent or less, and more preferably 0 percent of the tinted polymerizates have tinting defects, such as ferns.

Additive (b) is typically present in the polymerizable composition of the present invention in an amount of at least 0.05 percent by weight, preferably at least 0.1 percent by weight, and more preferably at least 0.3 percent by weight, based on the total weight of the composition. Additive (b) is also typically present in the composition of the present invention in an amount of less than 10 percent by weight, preferably less than 5 percent by weight and more preferably less than 3 percent by weight, based on the total weight of the composition. The amount of additive (b) present in the composition of the present invention may range between any combination of these values, inclusive of the recited values.

Additive (b) may be described as a block copolymeric polyether, having two or three polyether blocks as represented by —$(R_3O)_x$—, —$(R_4O)_y$— and —$(R_5O)_z$— in general formula II. The block copolymeric polyether additive (b) may have terminal hydroxyl groups, terminal ether groups, terminal carboxylic acid ester groups and combinations thereof. With further reference to general formula II, examples of $C_1$–$C_{20}$ linear or branched alkyls from which $R_2$ and $R_6$ may each be independently selected include, but are not limited to, methyl, ethyl, propyl, e.g., n-propyl and iso-propyl, butyl, pentyl, hexyl, heptyl, octyl, nonyl, decyl, undecyl, dodecyl, tridecyl tetradecyl, pentadecyl, hexadecyl, heptadecyl, octadecyl, nonadecyl and icosanyl.

Cycloalkyls having from 5 to 7 carbon atoms in the cyclic ring from which $R_2$ and $R_6$ of general formula II may each be independently selected include, but are not limited to, unsubstituted cycloalkyls, e.g., cyclopentyl, cyclohexyl and norbornyl, and substituted cycloalkyls, e.g., methylcyclohexyl, bornyl and isobornyl. Aryl groups of which $R_2$ and $R_6$ may each be independently selected include, but are not limited to, unsubstituted aryl groups, e.g., phenyl, benzyl, naphthalenyl and anthracenyl, and substituted aryl groups, such as 4-nonylphenylene.

Additionally, $R_2$ and $R_6$ of general formula II may each be independently selected from $C_2$–$C_{20}$ linear or branched alkanoyl, cycloalkanoyl having from 5 to 7 carbon atoms in the cyclic ring and aroyl. Examples of $C_2$–$C_{20}$ linear or branched alkanoyl groups from which $R_2$ and $R_6$ may each be independently selected include, but are not limited to, ethanoyl (acetyl), propanoyl, 2-methylpropanoyl, butanoyl, 2-methylbutanoyl, pentanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl and icosanoyl. Cycloalkanoyl groups from which each of $R_2$ and $R_6$ may be independently selected include, for example, cyclopentanoyl, cyclohexanoyl, norbornoyl, bornoyl and isobornoyl. Examples of aroyl groups from which each of $R_2$ and $R_6$ may be independently selected include, but are not limited to, benzoyl, naphthanoyl and anthracenoyl.

When $R_2$ and $R_6$ are not hydrogen, they are typically each independently selected from $C_1$–$C_{20}$ linear or branched alkyls, in particular $C_1$–$C_4$ linear or branched alkyls, and more particularly methyl. In a preferred embodiment of the present invention, $R_2$ and $R_6$ are each hydrogen, and the additive represented by general formula II has two terminal hydroxy groups.

With continued reference to general formula II, —$R_3O$—($R_3O$), —$R_4O$—($R_4O$) and —$R_5O$—($R_5O$) are each independently a divalent residue of an epoxide. As used herein and in the claims, the term "epoxide" refers to three membered cyclic ethers, e.g., ethylene oxide and propylene oxide. For purposes of illustration, when $R_4O$ is a residue of propylene oxide, the divalent —$R_4O$— residue may be represented by the following general formulas III and IV,

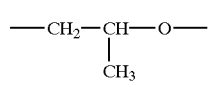

III

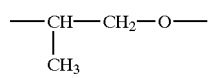

IV

When $R_4O$ is a residue of propylene oxide, it may, more specifically, be represented by formula III, formula IV or a combination of formulas III and IV. Due to the steric hindrance of the pendent methyl group of propylene oxide, formula III is believed to be the predominant representation relative to formula IV, as is known to the skilled artisan.

The —$(R_3O)_x$, —$(R_4O)_y$—and —$(R_5O)$— segments or blocks of general formula II, may contain one or more species of epoxide residues, preferably they each contain a single species of epoxide residues. Classes of epoxides of which $R_3O$, $R_4O$ and $R_5O$ may each independently be residues of include, but are not limited to, $C_2$–$C_{14}$ alkylene oxide, cycloalkylene oxide having from 5 to 12 carbon atoms in the ring and mixtures thereof. Examples of $C_2$–$C_{14}$ alkylene oxides include, but are not limited to, ethylene oxide, propylene oxide, (2,3-epoxypropyl)benzene, 1,2-epoxy-3-phenoxypropane, butylene oxide, e.g., 1,2-butylene oxide and 2,3-butylene oxide, pentylene oxide, e.g., 1,2-pentylene oxide and 2,3-pentylene oxide, hexylene oxide, e.g., 1,2-hexylene oxide, octylene oxide, e.g., 1,2-octylene oxide, decylene oxide, e.g., 1,2-epoxydecane, dodecylene oxide, e.g., 1,2-epoxydodecane, and epoxytetradecane, e.g., 1,2-epoxytetradecane. Examples of cycloalkylene oxide having from 5 to 12 carbon atoms in the ring include, but are not limited to, cyclopentene oxide, cyclohexene oxide, exo-2,3-epoxynorborane, cyclooctene oxide and cyclododecane epoxide. Typically, $R_3O$, $R_4O$ and $R_5O$ are each independently a divalent residue of an epoxide selected from ethylene oxide, propylene oxide, butylene oxide and mixtures thereof.

The value of subscript y of general formula II is at least 3, e.g., at least 5, 10, 15 or 20. The value of subscript y is also less than 200, e.g., less than 150, 100, 90, 80, 70, 50 or 40. The value of y may range between any combination of these numbers, inclusive of the recited numbers. When subscripts x and/or z are greater than zero, they each typically have values independently of at least 1, e.g., 2, 3, 5, 10, 15 or 20. The values of subscripts x and z are each independently less than 200, e.g., less than 150, 100, 90, 80, 70, 50 or 40. The values of x and z may each independently range between any combination of these numbers, inclusive of the recited numbers. As a result of the method(s) by which additive (b) may be prepared (as described further herein), the values of x, y and z as presented herein represent average numbers, as is known to the skilled artisan. The number molecular weight of polyether additive (b) may range widely, for example from 190 to 20,000 or from 1000 to 15,000 as determined by gel permeation chromatography.

In an embodiment of the present invention, $R_4O$ is a divalent residue of propylene oxide, and $R_3O$ and $R_5O$ are each divalent residues of ethylene oxide, and polyether additive (b) may be represented by the following general formula V,

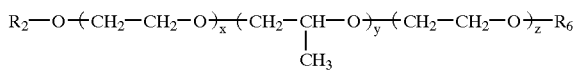

V

In general formula V, x, y and z have the same meanings as described previously herein with reference to general formula II. In a preferred embodiment of the present invention, and with reference to general formula V, $R_2$ and $R_6$ are each hydrogen, y is from 15 to 70, x and z are each greater than zero, the sum of x and z is from 2 to 300, and the ratio of y to the sum of x and z is from 0.15:1.0 to 7:1.0. In an embodiment of the present invention, and with further reference to general formula V, the ratio of y to the sum of x and z is preferably greater than 1:1, e.g., from 1.1:1.0 to 7:1.0 or from 1.1:1.0 to 2.0:1.0.

In another embodiment of the present invention, and with reference to general formula II, $R_2$ and $R_6$ are each hydrogen, $R_4O$ is a residue of butylene oxide, $R_3O$ and $R_5O$ are each residues of ethylene oxide, one of x and z is zero, y is from 10 to 50, the sum of x and z is from 15 to 100, and the ratio of y to the sum of x and z is from 0.15:1.0 to 1.5:1.0. In the case when one of x and z is zero, the polyether additive (b) described with reference to general formula II, is a diblock copolymer.

The additive represented by general formula II may be prepared by art-recognized methods, which typically involve a two and optionally a three stage reaction scheme. In one method, a glycol, e.g., 1,2-propylene glycol, is reacted with an epoxide, e.g., 1,2-propylene oxide, to form a dihydroxy terminated polyether intermediate, e.g., dihydroxy terminated poly(1,2-propylene ether). The dihydroxy terminated polyether intermediate is then further reacted with another epoxide, e.g., ethylene oxide, to form additive (b) having terminal hydroxy groups, and in which $R_3O$ and $R_4O$ are residues of the same epoxide, e.g., ethylene oxide.

In an alternative method, additive (b) may be prepared from the reaction of a first epoxide, e.g., ethylene oxide, with an alcohol, e.g., methanol or ethanol, or a carboxylic acid, e.g., acetic acid, to form a monohydroxy terminated polyether first intermediate having a terminal ether or carboxylic acid ester group. The first intermediate is then further reacted with a second epoxide that is different than the first epoxide, e.g., 1,2-propylene oxide, to form a monohydroxy terminated diblock copolymeric polyether having a terminal ether or carboxylic acid ester group. The monohydroxy terminated diblock copolymeric polyether having a terminal ether or carboxylic acid ester group may be used as additive (b) or as a second intermediate. The second intermediate may be further reacted with a third epoxide (which is different than the second epoxide, and the same or different than the first epoxide), e.g., ethylene oxide or butylene oxide, to form a monohydroxy terminated triblock copolymeric polyether having a terminal ether or carboxylic acid ester group.

The terminal hydroxy group(s) of the block copolymeric polyether additive (b) may be converted to terminal ether or carboxylic acid groups by methods that are know to the skilled artisan. For example, terminal carboxylic acid ester groups can be formed from the reaction of the hydroxy terminated polyether with an acid chloride. Terminal ether groups may be introduced into additive (b) by first converting the terminal hydroxy groups to halide groups, e.g., chlorine, by reaction with thionyl halide, e.g., thionyl chloride, as is known in the art. Reaction of the halide terminated polyether with an alkoxide, e.g., potassium methoxide, results in the formation of terminal ether groups, e.g., terminal methyl ether groups.

The polymerizable organic composition of the present invention includes also a radically polymerizable monomer as described above with reference to general formula I, which may be further described as a polyol(allyl carbonate) monomer. Polyol(allyl carbonate) monomers that may be used in the aforedescribed polymerizable organic composition are allyl carbonates of, for example, linear or branched aliphatic polyols, e.g., aliphatic glycol bis(allyl carbonate) compounds, and cycloaliphatic polyols. The scope of the present invention also includes allyl carbonates of aromatic polyols, e.g., 4,4'-isopropylidenediphenol bis(allyl carbonate). These monomers may further be described as unsaturated polycarbonates of polyols, e.g., glycols. The polyol(allyl carbonate) monomer may be prepared by procedures well known in the art, e.g., as described in U.S. Pat. Nos. 2,370,567 and 2,403,113.

With reference to general formula I, $R_1$ is an allyl group, which may be an unsubstituted allyl group or a substituted allyl group, as represented by the following general formula VI,

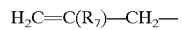

VI wherein $R_7$ is hydrogen, halogen, e.g., chlorine or bromine, or a $C_1$ to $C_4$ alkyl group, e.g., methyl or ethyl. More typically, $R_7$ is hydrogen and consequently general formula VI represents the unsubstituted allyl group, $H_2C=CH—CH_2—$.

With further reference to general formula I, R is a polyvalent residue of a polyol, which can, for example, be an aliphatic or cycloaliphatic polyol, containing 2, 3 or 4 hydroxy groups. Typically, the polyol contains 2 hydroxy groups, i.e., a glycol. When the polyol is an aliphatic polyol, it may be linear or branched and contain from 2 to 10 carbon atoms. Commonly, the aliphatic polyol is an alkylene glycol having from 2 to 4 carbons atoms, e.g., ethylene glycol, propylene glycol, trimethylene glycol, tetramethylene glycol, or a poly($C_2$–$C_4$ alkylene glycol), e.g., diethylene glycol, triethylene glycol, etc.

Specific examples of polyol(allyl carbonate) monomers that may be used in the present invention include, but are not limited to, ethylene glycol bis(2-chloroallyl carbonate), ethylene glycol bis(allyl carbonate), diethylene glycol bis(2-methylallyl carbonate), diethylene glycol bis(allyl carbonate), triethylene glycol bis(allyl carbonate), propylene glycol bis(2-ethylallyl carbonate), 1,3-propanediol bis(allyl carbonate), 1,3-butanediol bis(allyl carbonate), 1,4 butanediol bis(2-bromoallyl carbonate), dipropylene glycol bis (allyl carbonate), trimethylene glycol bis(2-ethylallyl carbonate), pentamethylene glycol bis(allyl carbonate), 1,4-cyclohexanediol bis(allyl carbonate) and 4,4'-isopropylidenebiscyclohexanol bis(allyl carbonate).

A preferred polyol(allyl carbonate) monomer in the composition of the present invention is diethylene glycol bis (allyl carbonate). Commercially available examples of diethylene glycol bis(allyl carbonate) monomers include CR-39® monomer and HIGH ADC CR-39® monomer, Chemical Abstracts (CAS) No. 142-22-3, available from PPG Industries, Inc.

A detailed description of polyol(allyl carbonate) monomers that may be used in the polymerizable organic compositions of the present invention may be found in U.S. Pat. No. 4,637,698 at column 3, line 33 through column 5, line 61. That disclosure is hereby incorporated by reference, and is summarized above.

As used in the present description with reference to the radically polymerizable monomer represented by general formula I, the term "polyol(allyl carbonate) monomer" and like names, e.g., diethylene glycol bis(allyl carbonate), is intended to mean and include the named monomers or prepolymers thereof and any related monomer or oligomer species contained therein.

The polyol(allyl carbonate) monomer is typically present in the polymerizable composition of the present invention in an amount of at least 90 percent by weight, preferably at least 95 percent by weight, and more preferably at least 97 percent by weight, based on the total weight of the polymerizable composition. Also, the polyol(allyl carbonate) monomer is typically present in the composition in an amount of less than 99.95 percent by weight, preferably less than 99.9 percent by weight, and more preferably less than 99.7 percent by weight, based on the total weight of the polymerizable composition. The polyol(allyl carbonate) monomer may be present in the composition of the present invention in an amount ranging between any combination of these values, inclusive of the recited values.

Polymerization of the polymerizable composition of the present invention may be accomplished by adding to the composition an initiating amount of material capable of generating free radicals, such as organic peroxy compounds, i.e., an initiator. Methods for polymerizing polyol(allyl carbonate) compositions are well known to the skilled artisan and any of those well known techniques may be used to polymerize the aforedescribed polymerizable compositions.

Suitable examples of organic peroxy compounds, that may be used as initiators include: peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropylperoxydicarbonate; diacylperoxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters such as t-butylperoxy pivalate, t-butylperoxy octylate, and t-butylperoxyisobutyrate; methylethylketone peroxide, acetylcyclohexane sulfonyl peroxide, and azobisisobutyronitrile. Preferred initiators are those that do not discolor the resulting polymerizate. A preferred initiator is diisopropyl peroxydicarbonate.

The amount of initiator used to initiate and polymerize the polymerizable compositions of the present invention may vary and will depend on the particular initiator used. Only that amount that is required to initiate and sustain the polymerization reaction is required, i.e., an initiating amount. With respect to the preferred peroxy compound, diisopropyl peroxydicarbonate, typically between 2.0 and 5.0 parts of that initiator per 100 parts of the polymerizable organic composition (phm) may be used. More usually, between 2.5 and 4.0 phm is used to initiate the polymerization. The amount of initiator and the consequent cure cycle should be adequate to produce a polymerizate having a 15 second Barcol hardness of at least 1, preferably, at least 4, e.g., from 4 to 35. Typically, the cure cycle involves heating the polymerizable organic composition in the presence of the initiator from room temperature to 85° C. over a period of from 15 hours to 30 hours.

Various conventional additives may be incorporated into the polymerizable composition of the present invention. Such conventional additives may include light stabilizers, heat stabilizers, ultraviolet light absorbers, mold release agents, pigments and flexibilizing additives that are not radically polymerizable, e.g., alkoxylated phenol benzoates and poly(alkylene glycol) dibenzoates. Conventional additives are typically present in the compositions of the present invention in amounts totaling less than 10 percent by weight, more typically less than 5 percent by weight, and commonly less than 3 percent by weight, based on the total weight of the polymerizable composition.

Polymerizates obtained from polymerization of polymerizable organic compositions of the present invention will be solid, transparent and substantially free of tinting defects. Solid articles that may be prepared from the polymerizable compositions of the present invention include, but are not limited to, optical lenses, such as plano and ophthalmic lenses, sun lenses or sunglasses, windows, automotive transparencies, e.g., windshields, sidelights and backlights, and aircraft transparencies, etc.

The present invention is more particularly described in the following examples, which are intended to be illustrative only, since numerous modifications and variations therein will be apparent to those skilled in the art. Unless otherwise specified, all parts and percentages are by weight.

CASTING COMPOSITION EXAMPLES

The following summarizes polymerizable casting compositions that are comparative and compositions that are in accordance with the present invention. Casting composition A is a comparative composition, and casting compositions B–D represent compositions according to the present invention.

Casting Compositions

| Ingredients | Casting Composition A | Casting Composition B | Casting Composition C | Casting Composition D |
|---|---|---|---|---|
| CR-39 ® monomer (a) | 100.0 | 99.6 | 99.5 | 99.5 |
| diisopropyl peroxydicarbonate (b) | 2.6 | 2.9 | 2.9 | 2.9 |
| Additive-1 (c) | 0 | 0.5 | 0 | 0 |
| Additive-2 (d) | 0 | 0 | 0.5 | 0 |
| Additive-3 (e) | 0 | 0 | 0 | 0.5 |

(a) CR-39 ® diethylene glycol bis(allyl carbonate) monomer available commercially from PPG Industries, Inc.
(b) In casting compositions B, C and D the level of diisopropyl peroxydicarbonate initiator was adjusted such that tinted polymerizates obtained therefrom had substantially the same percent transmission as tinted polymerizates obtained (under the same tinting conditions) from composition A, e.g. having about 35 percent transmission. The percent transmittance was determined using a HunterLab Model ColorQuest II colorimeter employing the CIE Tristimulus XYZ scale, illuminant D65 and 10° C. observer.
(c) PLURONIC ® P103 block copolymer surfactant available commercially from BASF Corporation.
(d) PLURONIC ® L62D block copolymer surfactant available commercially from BASF Corporation.
(e) B40-2500 ethylene oxide, butylene oxide copolymer from Dow Chemical Company.

CAST LENS EXAMPLES

The casting compositions A, B, C and D were each mixed at room temperature and injected separately into glass lens molds used to prepare circular lenses having a +5 diopter and an outer rim diameter of 6.5 cm. Twenty (20) lens molds were filled at a time and their contents polymerized using the same cure cycle. The cure cycle used involved heating the molds in an electric forced air oven in stages from 48° C. to 85° C. over a period of 18 hours, followed by cooling to and holding at 60° C. until demolding of the lenses.

The cast lenses were then tinted by imbibing them with a black dye. An aqueous tinting solution of 1 part BPI® Molecular Catalytic™ Black Dye, commercially available from Brain Power Incorporated, and 10 parts deionized water was heated to and held at a temperature of 94° C.–95° C. The lenses cast from casting compositions A, B, C and D were fully immersed in the heated dye solution for a period of 5 minutes, after which they were thoroughly rinsed with deionized water. The tinted lenses were evaluated for tinting defects, the results of which are summarized in Table 1.

TABLE 1

Evaluation of Tinted Lenses

| Casting Composition | Number of Tinted Lenses Evaluated | Number of Tinted Lenses Having Tinting Defects (f) | Percent of Tinted Lenses Having Tinting Defects (g) |
|---|---|---|---|
| A | 175 | 37 | 21 |
| B | 179 | 0 | 0 |
| C | 176 | 9 | 5 |
| D | 52 | 0 | 0 |

(f) The lenses were evaluated for tinting defects by means of visual naked eye inspection. Tinting defects were observed as having a lighter colored vein or fern-like appearance relative to the rest of the tinted lens.
(g) 100 × (the number of tinted lenses observed to have tinting defects/the number of tinted lenses evaluated). For example, with casting composition A: 100 × (37/175) = 21 percent (%).

The results summarized in Table 1 show that articles, e.g., lenses, cast from polymerizable compositions according to the present invention, such as Compositions B–D, have significantly fewer tinting defects than lenses cast from comparative compositions, such as Composition A.

The present invention has been described with reference to specific details of particular embodiments thereof. It is not intended that such details be regarded as limitations upon the scope of the invention except insofar as and to the extent that they are included in the accompanying claims.

We claim:
1. A polymerizable composition comprising:
(a) a radically polymerizable monomer represented by the following general formula,

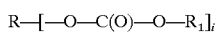

wherein R is a polyvalent residue of a polyol having at least two hydroxy groups, $R_1$ is an allyl group, and i is a whole number from 2 to 4; and
(b) an additive represented by the following general formula,

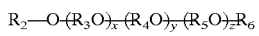

wherein $R_2$ and $R_6$ are each selected independently from hydrogen, $C_1$–$C_{20}$ linear or branched alkyl, cycloalkyl having from 5 to 7 carbon atoms in the cyclic ring, aryl, $C_2$–$C_{20}$ linear or branched alkanoyl, cycloalkanoyl having from 5 to 7 carbon atoms in the cyclic ring and aroyl, $R_2$ and $R_6$ each being free of radically polymerizable ethylenically unsaturated groups; $R_3O$ and $R_5O$ are the same or different; $R_4O$ is different than each of $R_3O$ and $R_5O$; $R_3O$, $R_4O$ and $R_5O$ are each independently a divalent residue of an epoxide; x and z are each independently a number from 0 to 200, provided that the sum of x and z is greater than zero; and y is a number from 3 to 200; said additive (b) being present in said composition in an amount at least sufficient such that a polymerizate of said composition is substantially free of tinting defects.

2. The polymerizable composition of claim 1 wherein $R_3O$, $R_4O$ and $R_5O$ are each independently divalent residues of $C_2$–$C_{14}$ alkylene oxide, cycloalkylene oxide having from 5 to 12 carbon atoms in the ring and mixtures thereof.

3. The polymerizable composition of claim 2 wherein $R_2$ and $R_6$ are each hydrogen, $R_3O$, $R_4O$ and $R_5O$ are each independently a divalent residue of an epoxide selected from ethylene oxide, propylene oxide, butylene oxide and mixtures thereof.

4. The composition of claim 1 wherein $R_2$ and $R_6$ are each hydrogen, $R_4O$ is a divalent residue of propylene oxide, and $R_3O$ and $R_5O$ are each divalent residues of ethylene oxide.

5. The composition of claim 4 wherein y is from 15 to 70, x and z are each greater than zero, the sum of x and z being from 2 to 300, and the ratio of y to the sum of x and z being from 0.15:1.0 to 7:1.0.

6. The composition of claim 1 wherein $R_2$ and $R_6$ are each hydrogen, $R_4O$ is a divalent residue of butylene oxide, and $R_3O$ and $R_5O$ are each divalent residues of ethylene oxide.

7. The composition of claim 6 wherein one of x and z is zero, y is from 10 to 50, the sum of x and z is from 15 to 100, and the ratio of y to the sum of x and z is from 0.15:1.0 to 1.5:1.0.

8. The composition of claim 1 wherein said additive (b) is present in an amount of from 0.05 percent by weight to 10 percent by weight, based on the total weight of said composition.

9. The polymerizable composition of claim 1 wherein R is a divalent residue of a poly($C_2$–$C_4$)alkylene glycol or 4,4'-isopropylidenediphenol, and i is 2.

10. The polymerizable composition of claim 9 wherein R is a divalent residue of diethylene glycol, and $R_1$ is an unsubstituted allyl group.

11. A polymerizable composition comprising:
 (a) a radically polymerizable monomer represented by the following general formula,

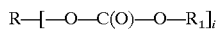

wherein R is a divalent residue of a poly($C_2$–$C_4$) alkylene glycol, $R_1$ is an allyl group and i is 2; and (b) an additive represented by the following general formula,

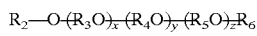

wherein $R_2$ and $R_6$ are each selected independently from hydrogen, $C_1$–$C_{20}$ linear or branched alkyl, cycloalkyl having from 5 to 7 carbon atoms in the cyclic ring, aryl, $C_2$–$C_{20}$ alkanoyl, cycloalkanoyl having from 5 to 7 carbon atoms in the cyclic ring, aroyl, $R_2$ and $R_6$ each being free of radically polymerizable ethylenically unsaturated groups; $R_3O$ and $R_5O$ are the same or different; $R_4O$ is different than each of $R_3O$ and $R_5O$; $R_3O$, $R_4O$ and $R_5O$ are each independently a divalent residue of an epoxide selected from ethylene oxide, propylene oxide, butylene oxide and mixtures thereof; x and z are each independently a number from 0 to 200, provided that the sum of x and z is greater than zero; and y is a number from 3 to 200; said additive (b) being present in said composition in an amount at least sufficient such that a polymerizate of said composition is substantially free of tinting defects.

12. The composition of claim 11 wherein $R_2$ and $R_6$ are each hydrogen, $R_4O$ is a divalent residue of propylene oxide, and $R_3O$ and $R_5O$ are each divalent residues of ethylene oxide.

13. The composition of claim 12 wherein y is from 15 to 70, x and z are each greater than zero, the sum of x and z being from 2 to 300, and the ratio of y to the sum of x and z being from 0.15:1.0 to 7:1.0.

14. The composition of claim 13 wherein R is a divalent residue of diethylene glycol, and $R_1$ is an unsubstituted allyl group.

15. The polymerizate of claim 1.

16. The polymerizate of claim 14.

17. The polymerizate of claim 16 wherein said polymerizate is a lens having a positive diopter.

* * * * *